(12) United States Patent
Weber

(10) Patent No.: US 8,419,513 B2
(45) Date of Patent: Apr. 16, 2013

(54) VENTILATION DEVICE

(75) Inventor: Andreas Weber, Contwig (DE)

(73) Assignee: TRW Automotive Electronics GmbH, Radolfzell (DE)

( * ) Notice: Subject to any disclaimer, the term of this patent is extended or adjusted under 35 U.S.C. 154(b) by 213 days.

(21) Appl. No.: 13/044,586

(22) Filed: Mar. 10, 2011

(65) Prior Publication Data
US 2011/0230129 A1 Sep. 22, 2011

(30) Foreign Application Priority Data

Mar. 19, 2010 (DE) .......................... 10 2010 012 087

(51) Int. Cl.
*B60H 1/24* (2006.01)
(52) U.S. Cl.
USPC ........................................................ 454/162
(58) Field of Classification Search .................. 454/162; 24/608, 609, 573.09, 573.11
See application file for complete search history.

(56) References Cited

U.S. PATENT DOCUMENTS

| | | | | |
|---|---|---|---|---|
| 5,601,117 | A * | 2/1997 | Lewis et al. | 137/855 |
| 5,904,618 | A * | 5/1999 | Lewis | 454/162 |
| 6,061,882 | A * | 5/2000 | Otte-Wiese | 24/487 |
| 6,132,308 | A * | 10/2000 | Dietz et al. | 454/162 |
| 6,837,784 | B2 * | 1/2005 | Omiya et al. | 454/162 |
| 7,993,725 | B2 * | 8/2011 | Rossi et al. | 428/100 |
| 2003/0022616 | A1 * | 1/2003 | Stiehl | 454/162 |
| 2008/0076344 | A1 * | 3/2008 | Flowerday | 454/162 |
| 2009/0075580 | A1 * | 3/2009 | Mootz et al. | 454/162 |
| 2009/0104866 | A1 * | 4/2009 | Loewe | 454/162 |
| 2009/0280736 | A1 | 11/2009 | Schneider | |
| 2010/0291854 | A1 * | 11/2010 | Carlson et al. | 454/162 |

FOREIGN PATENT DOCUMENTS

| | | |
|---|---|---|
| DE | 69603518 | 4/2000 |
| DE | 202006020365 | 7/2008 |
| EP | 0728606 | 1/1996 |
| EP | 0874182 | 4/1998 |

* cited by examiner

*Primary Examiner* — Steven B McAllister
*Assistant Examiner* — Frances H Kamps
(74) *Attorney, Agent, or Firm* — Tarolli, Sundheim, Covell & Tummino LLP

(57) ABSTRACT

A ventilation device (10), in particular for a vehicle interior, has a frame (12) which includes at least one opening (16), and at least one non-return flap (20), the non-return flap (20) having at least one recess (26) provided thereon through which a holding member (22) provided on the frame (12) extends, and the non-return flap (20), depending on the active pressure differential, being movably adjustable on the holding member (22) between a closed position, in which the non-return flap (20) rests against the frame (12) and closes the at least one opening (16) of the frame (12), and an open position. The holding member (22) is deformable between a mounting position, in which the non-return flap (20) can be mounted to the holding member (22), and a locked position, in which the non-return flap (20) can not be dismounted.

14 Claims, 4 Drawing Sheets

VENTILATION DEVICE

FIELD OF THE INVENTION

The present invention relates to a ventilation device, in particular for a vehicle interior.

BACKGROUND OF THE INVENTION

Ventilation devices serve to carry off the air supplied to the vehicle interior via a ventilation system. The ventilation device includes a frame having a non-return flap mounted therein which can open in case of an overpressure in the vehicle interior, so that air can escape from the vehicle interior. When no air flows out of the vehicle interior, the non-return flap rests against the frame, as a result of which the frame is sealed and an ingress of moisture, dirt or exhaust gases into the vehicle interior is prevented.

A ventilation device of the type initially mentioned is disclosed in DE 20 2006 020 365. Pins which each have a head are used as holding members. The non-return flap is mounted on the holding members by pressing the head of the respective holding member through the recess ("buttonhole") of the non-return flap in the nature of a button. It has turned out, however, that in operation, the non-return flap can become detached from the holding members, so that a proper functioning is no longer ensured.

BRIEF SUMMARY OF THE INVENTION

It is an object of the invention to provide a ventilation device in which the non-return flap can be mounted in a simple manner and is especially safely fastened.

To achieve this object, a ventilation device, in particular for a vehicle interior, has a frame which includes at least one opening, and at least one non-return flap, the non-return flap having at least one recess provided thereon through which a holding member provided on the frame extends, and the non-return flap, depending on the active pressure differential, being movably adjustable on the holding member between a closed position, in which the non-return flap rests against the frame and closes the at least one opening of the frame, and an open position. The holding member is deformable between a mounting position, in which the non-return flap can be mounted to the holding member, and a locked position, in which the non-return flap can not be dismounted.

The invention is based on the fundamental concept of no longer deforming the non-return flap during mounting, but, rather, a part of the frame, so that a positive locking of the non-return flap is obtained. In the mounting position of the holding member, it is possible to simply slide the non-return flap onto the holding member, so that no force is required here for fastening or for mounting the non-return flap. In a second manufacturing step, the holding member is deformed into the locked position, in which the non-return flap can no longer be dismounted. The holding member may, for example, be deformed in such a way that, together with the frame, it forms a closed eye for the non-return flap to be mounted therein by means of its recess. This closed eye reliably excludes that the non-return flap slips off or slips out of the holding member.

The free end of the holding member may, for example, be hooked in an opening on the frame when in the locked position. After mounting the non-return flap, the holding member is bent over so far that it hooks into the opening of the frame, whereby a closed eye is formed in which the non-return flap is captively supported by the recess. No components on which the non-return flap could get caught during mounting protrude through the opening.

According to a preferred embodiment, provision is made that the free end of the holding member in the locked position is hooked behind a latching projection on the frame. In this way, the free end of the holding member can be locked in place particularly reliably.

In the locked position of the holding member, the non-return flap may be mounted on the holding member for limited movement towards the free end thereof. The ventilation device is opened here not only by a deformation of the non-return flap, but also by a shifting or swiveling of the non-return flap in relation to the holding member or to the frame. In this way, an especially large opening cross-section may be obtained.

To ensure a simple shifting along the holding member, the recess of the non-return flap is preferably larger than the cross-section of the holding member, so that the non-return flap can not get jammed or stuck on the holding member.

In the open position, for example, the non-return flap is shifted on the holding member towards the free end. This means that the non-return flap or the ventilation device is opened at least in part by a swiveling of the non-return flap, so that a particularly large opening cross-section is produced.

The non-return flap may have an intermediate position, in which the flap is swiveled against the holding member, i.e. in this position the non-return flap is only swiveled and not deformed. The resistance of the non-return flap during shifting or swiveling along the holding member is lower than the force that is required to bend or deform the non-return flap. In addition, the resistance to opening of the non-return flap during swiveling is constant. Swiveling the non-return flap or shifting the non-return flap on the holding member causes the resistance put up by the non-return flap during opening of the ventilation device to be reduced, so that an exchange of air or a pressure equalization is possible already with smaller pressure differences. To move the non-return flap from the intermediate position to the fully opened position, the non-return flap can be elastically deformed, in addition to the swiveling movement.

Preferably, the holding member protrudes from the frame in the direction of flow through the ventilation device. The joint that is formed by the holding member thus protrudes in the direction of the swiveling movement of the non-return flap, so that a simple shifting of the non-return flap on the holding member is possible.

To fasten the ventilation device, the frame preferably has fastening devices provided thereon for fastening the frame to a vehicle component. The fastening devices are latching members, for example, which can latch on a vehicle component, or other suitable fastening devices.

To ensure the tightness of the ventilation device, the frame additionally has sealing elements provided thereon for sealing the frame against the vehicle component.

The non-return flap is preferably made from a flexible material, so that, in addition to being swiveled, it can be deformed. This improves the sealing of the non-return flap on the frame of the ventilation device.

DETAILED DESCRIPTION OF PREFERRED EMBODIMENTS

Figure 1:
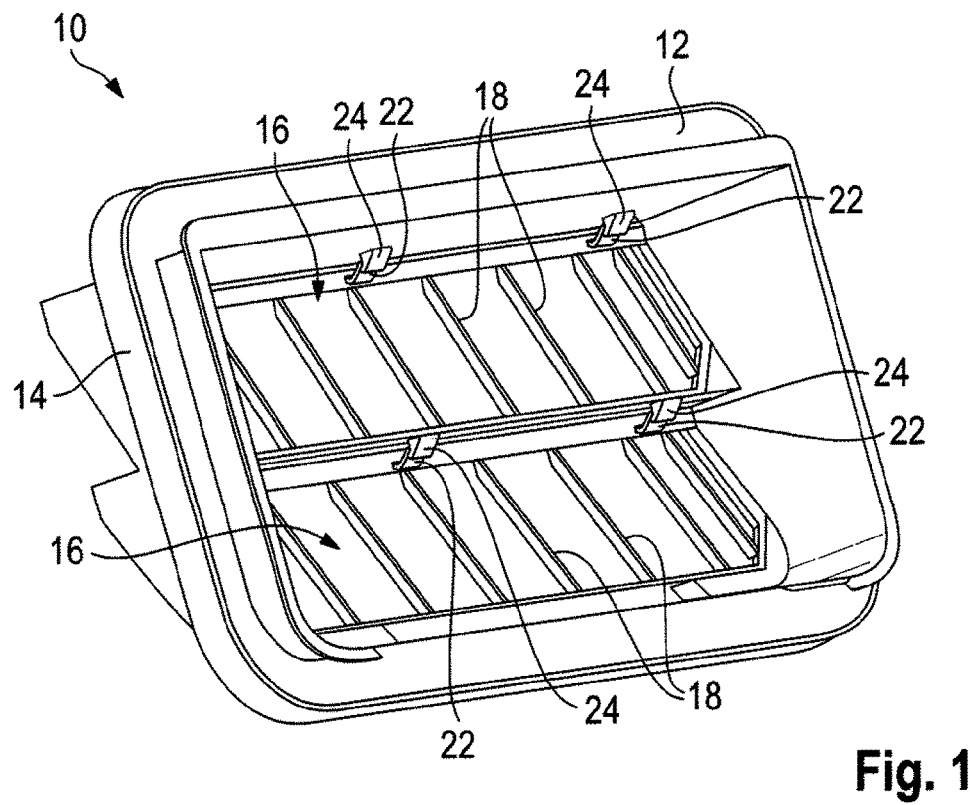
FIG. 1 shows a perspective view of a ventilation device according to the invention.

The ventilation device 10 illustrated in FIG. 1 includes a frame 12 which can be fastened in an opening of a vehicle component (not shown). A continuously surrounding sealing element 14 is provided on the frame 12 for sealing the ventilation device 10 in the opening of the vehicle component. The frame 12 has two openings 16 which are each divided by a plurality of dividing webs 18 for stabilizing the frame. Each of the openings 16 has a non-return flap 20 provided thereon, which fully closes the respective opening 16 in the closed position illustrated in FIG. 1. In the closed position, the non-return flap 20 rests against the frame 12 and is supported by the dividing webs 18. Each of the non-return flaps 20 is movably mounted on the frame 12 by three holding members 22 (see also FIG. 2), so that they can be moved from the closed position illustrated here to an open position, in which the openings 16 of the frame 12 are exposed. Basically, any other number of holding members may also be used.

Figure 2:
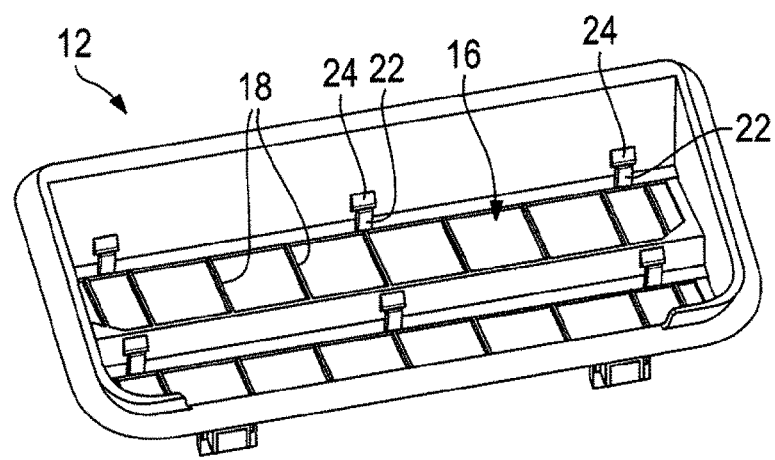
FIG. 2 shows a perspective view of the frame of the ventilation device shown in FIG. 1.

As can be seen in FIG. 2, the holding members 22 each protrude from the frame 12 towards the non-return flap 20. The holding members 22 are made from a flexible or deformable material here and can be bent over such that they can each latch by a free end 28 behind latching projections 24 provided on the frame 12. Alternatively, the free end 28 of each holding member 22 can be bent over to extend through a corresponding opening on the frame 12, illustrated in phantom at 29 in FIG. 5 and FIG. 6.

Figure 3:
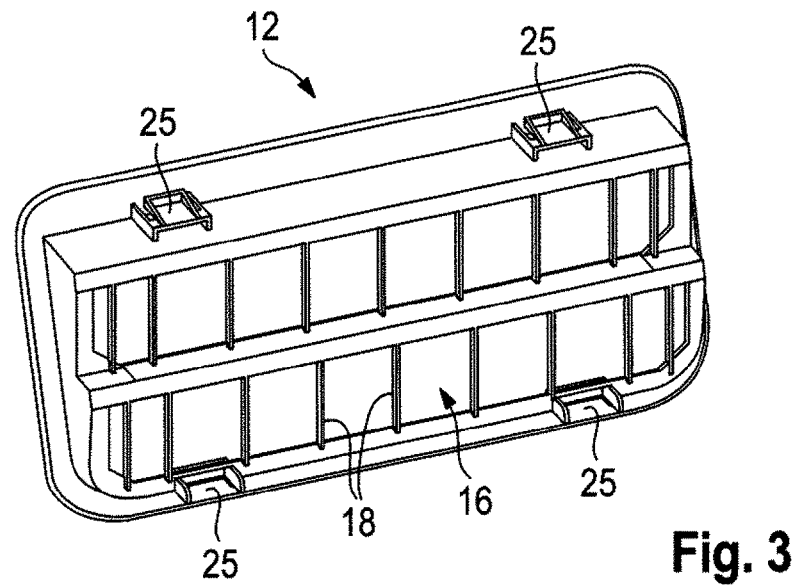
FIG. 3 shows a second perspective view of the frame shown in FIG. 2.

As can be seen in particular in FIG. 3, a plurality of fastening devices 25 is provided on the rear side of the frame 12 to fasten the frame 12 and thus the ventilation device 10 to a vehicle component. The fastening devices 25 in this case are latching devices which are each arranged opposite one another in pairs and can engage or latch on the rear side of the component. But it is also conceivable that other suitable fastening devices 25 are used.

Figure 4:
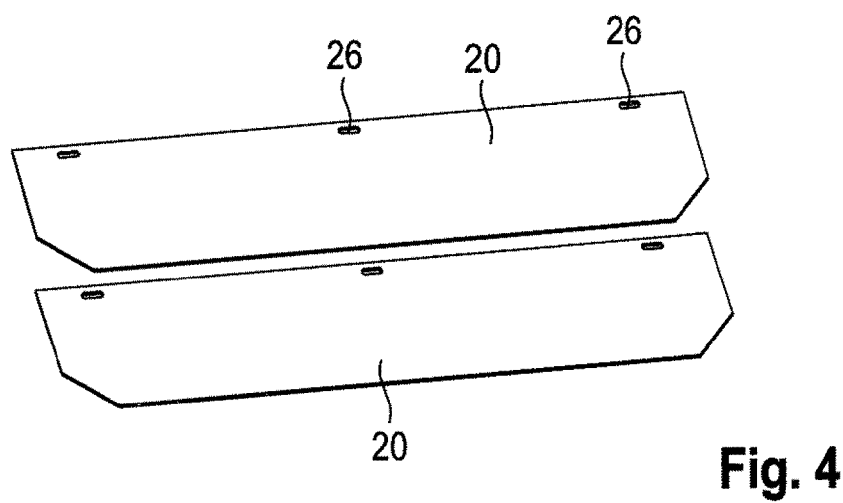
FIG. 4 shows the non-return flaps of the ventilation device shown in FIG. 1.

The non-return flaps 20 illustrated in FIG. 4 are made of a flexible material, so that the non-return flaps 20 can be deformed for opening the ventilation device 10. Each of the non-return flaps 20 includes three recesses 26 corresponding to the holding members 22.

In the initial or mounting position, the holding members 22 protrude from the frame roughly straight. The non-return flaps 20 can therefore be easily slid by their recesses 26 onto the holding members 22 (see also FIG. 5). The holding members 22 may have a cross-section here that widens towards the frame 12, so that when the non-return flap 20 is mounted at the frame 12, the non-return flap 20 is automatically centered with respect to the frame 12.

After the non-return flaps 20 are slid onto the holding members 22, the latter are bent or deformed towards the latching projections 24 until their respective free ends 28 hook behind the latching projections 24 or into the openings 29 in the frame 12. In any case, in the locked position, each of the holding members 22 together with the frame 12 forms a closed eye in which the non-return flap 20 is captively mounted.

The recesses 26 of the non-return flap 20 are made to be larger here than the cross-section of the holding members 22, so that the non-return flap 20 can be shifted along, and be tilted on, the holding member 22 with little resistance.

Figure 5:
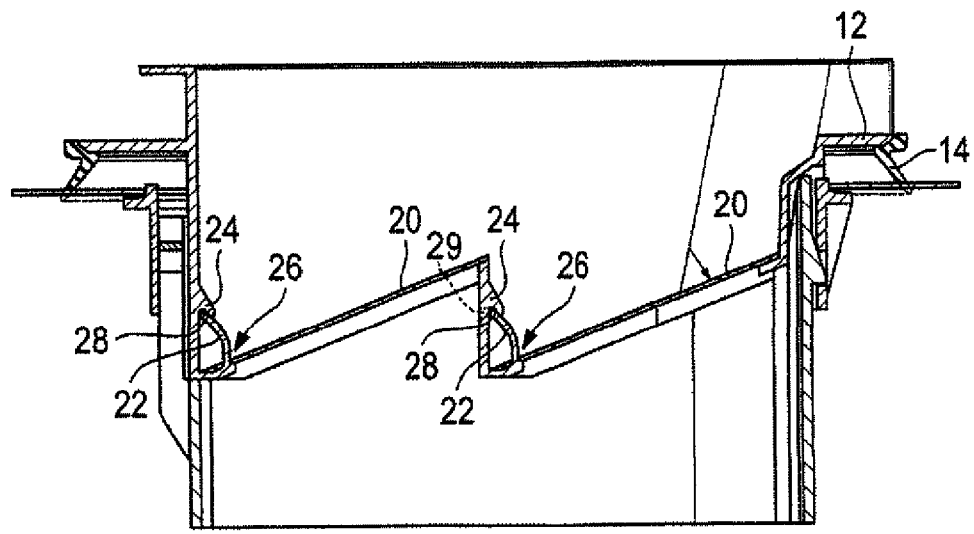
FIG. 5 shows a sectional view of the ventilation device shown in FIG. 1, with the non-return flaps closed.
Figure 6:
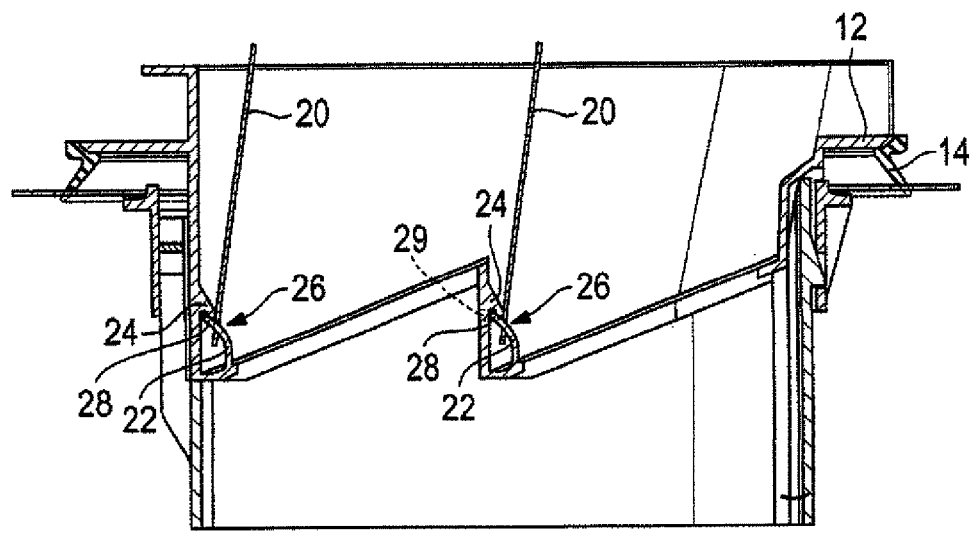
FIG. 6 shows a sectional view of the ventilation device with the non-return flaps open.

As can be seen in particular in FIG. 6, which shows the ventilation device 10 with the non-return flap 20 open, the non-return flap 20, when adjusted from the closed position illustrated in FIG. 5 to the open position, is not itself deformed, but shifted or swiveled along the holding member 22. This results in that for opening the non-return flaps, a very much smaller force is necessary than with non-return flaps which have to deform during the opening process, so that even with lower pressure differentials, the non-return flap 20 and therefore the ventilation device 10 will open.

Deviating from the embodiment shown here, it is, however, also conceivable that the non-return flap 20 is shifted or swiveled along the holding member 22 only to an intermediate position and is additionally deformed in order to be fully opened.

Figure 7:
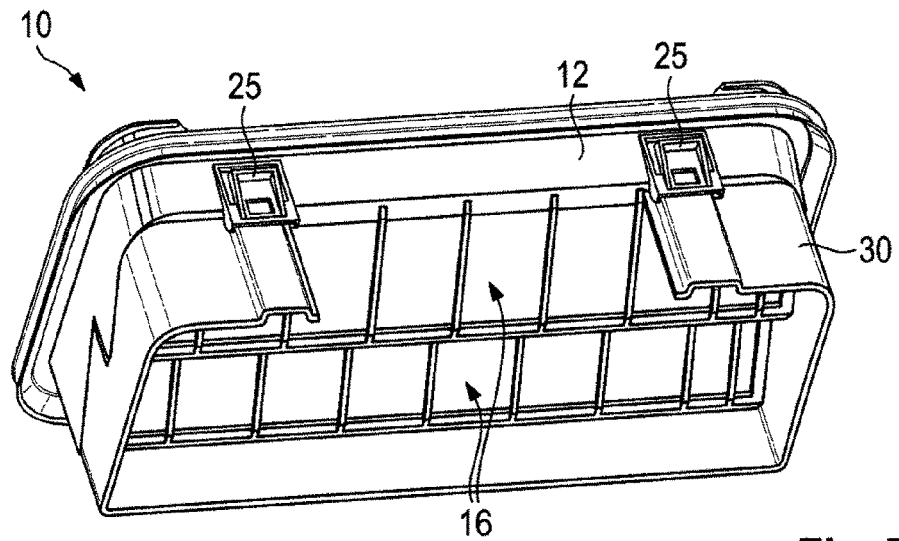
FIG. 7 shows a second embodiment of the non-return flap according to the invention.

The second embodiment of the ventilation device 10 as illustrated in FIG. 7 substantially corresponds to the embodiment illustrated in FIGS. 1 to 6. Provision is made here merely additionally for an acoustic hood 30 on the rear side of the frame 12, the acoustic hood providing for an improved sound absorption of the ventilation device 10. The acoustic hood 30 is in the form of an extension of the frame 12 here, which may be lined with foam elements, for example (not shown here), for better noise absorption.

Figure 8:
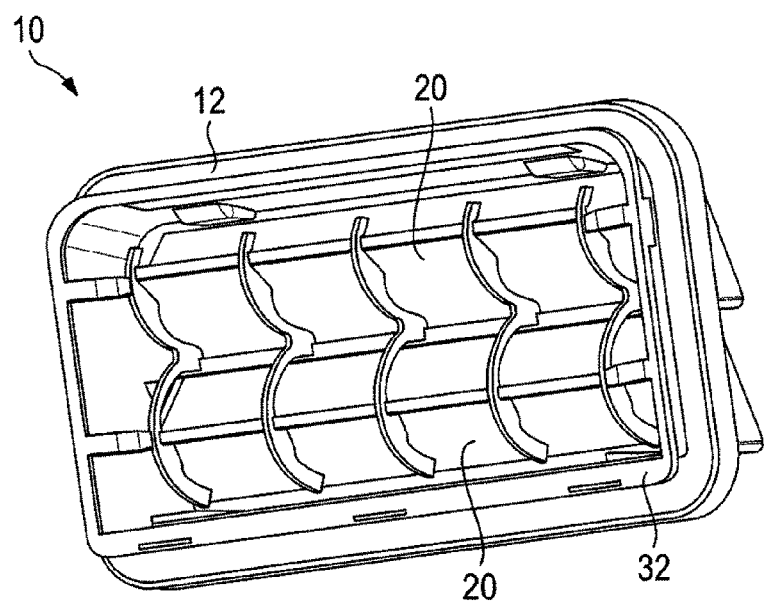
FIG. 8 shows a third embodiment of a ventilation device according to the invention.

The third embodiment, illustrated in FIG. 8, additionally has a further frame member 32, a so-called flutter curve, on the front face of the frame 12. In the open position of the non-return flap 20, the latter rests against the frame member 32 to prevent the non-return flap 20 from vibrating in the air flow, as a result of which noises caused by the air flowing through are reduced.

The invention claimed is:

1. A ventilation device (10), in particular for a vehicle interior, comprising a frame (12) which has at least one opening (16), and at least one non-return flap (20), the non-return flap (20) having at least one recess (26) provided thereon through which a holding member (22) provided on the frame (12) extends, and the non-return flap (20), depending on the active pressure differential, being adjustable between a closed position, in which the non-return flap (20) rests against the frame (12) and closes the at least one opening (16) of the frame (12), and an open position, the holding member (22) being deformable between a mounting position, in which the non-return flap (20) can be mounted to the holding member (22), and a locked position, in which the non-return flap (20) can not be dismounted, wherein a free end (28) of the holding member (22) includes an elastically deformable barb for placing the holding member (22) in the locked position.

2. A ventilation device (10), in particular for a vehicle interior, comprising a frame (12) which has at least one opening (16), and at least one non-return flap (20), the non-return flap (20) having at least one recess (26) provided thereon through which a holding member (22) provided on the frame (12) extends, and the non-return flap (20), depending on the active pressure differential, being adjustable between a closed position, in which the non-return flap (20) rests against the frame (12) and closes the at least one opening (16) of the frame (12), and an open position, the holding member (22) being deformable between a mounting position, in which the non-return flap (20) can be mounted to the holding member (22), and a locked position, in which the non-return flap (20) can not be dismounted, wherein the free end (28) of the holding member (22) in the locked position is hooked in and held in place an opening on the frame (12).

3. A ventilation device (10), in particular for a vehicle interior, comprising a frame (12) which has at least one opening (16), and at least one non-return flap (20), the non-return flap (20) having at least one recess (26) provided thereon through which a holding member (22) provided on the frame (12) extends, and the non-return flap (20), depending on the active pressure differential, being adjustable between a closed position, in which the non-return flap (20) rests against the frame (12) and closes the at least one opening (16) of the frame (12), and an open position, the holding member (22) being deformable between a mounting position, in which the non-return flap (20) can be mounted to the holding member (22), and a locked position, in which the non-return flap (20) can not be dismounted, wherein the free end (28) of the holding member (22) in the locked position is hooked behind and held in place by a latching projection (24) on the frame (12).

4. The ventilation device according to claim 1, wherein in the locked position of the holding member (22), the non-return flap (20) is mounted for limited movement towards the free end (28).

5. The ventilation device according to claim 1, wherein the recess (26) of the non-return flap (20) is larger than the cross-section of the holding member (22).

6. The ventilation device according to claim 1, wherein in the open position, the non-return flap (20) is shifted on the holding member (22) towards the free end (28).

7. The ventilation device according to claim 1, wherein the non-return flap (20) has an intermediate position, in which the non-return flap (20) is swiveled against the holding member (22).

8. The ventilation device according to claim 1, wherein the holding member (22) protrudes from the frame (12) in the direction of flow through the ventilation device.

9. The ventilation device according to claim 1, wherein the frame (12) has fastening devices (25) provided thereon for fastening the frame (12) to a vehicle component.

10. The ventilation device according to claim 1, wherein the frame (12) has sealing elements (14) provided thereon.

11. The ventilation device according to claim 1, wherein the non-return flap (20) is made from a flexible material.

12. The ventilation device according to claim 1, wherein the shape of the non-return flap is maintained as the non-return flap moves between the closed position and the open position.

13. The ventilation device according to claim 1, wherein the non-return valve slides along the holding member to move between the closed position and the open position such that the opening in the frame is substantially unobstructed.

14. The ventilation device according to claim 3, wherein the non-return valve is slidable along the holding member into engagement with the latching projection to place the non-return valve in the open position.

\* \* \* \* \*